Nov. 21, 1967     C. B. MATSON     3,353,194
FOLDING COT STRUCTURE
Filed July 28, 1966            2 Sheets-Sheet 1
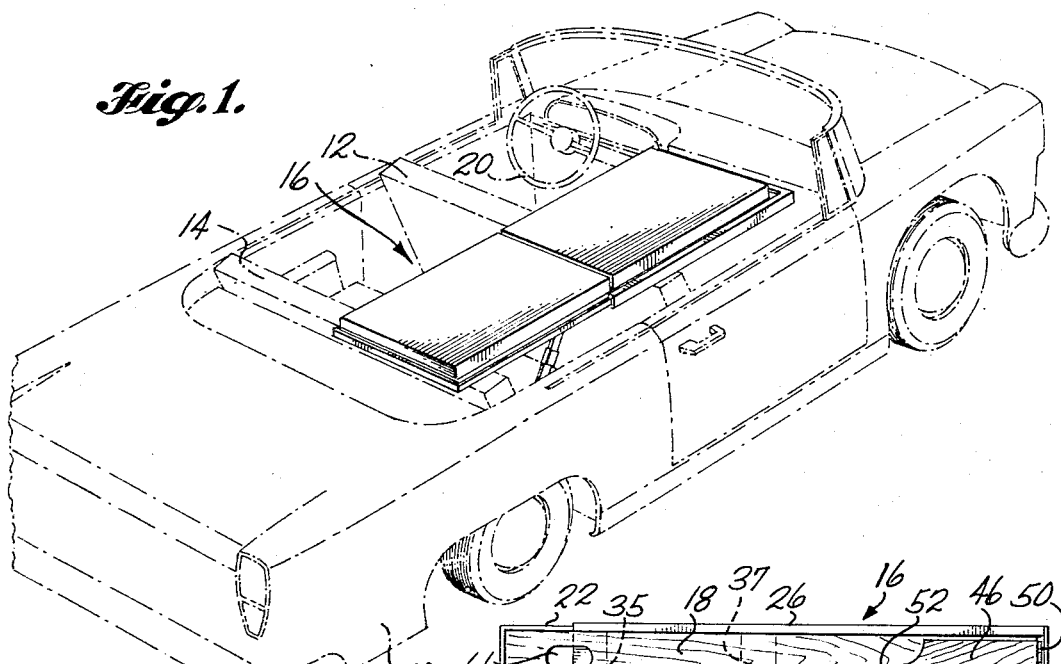
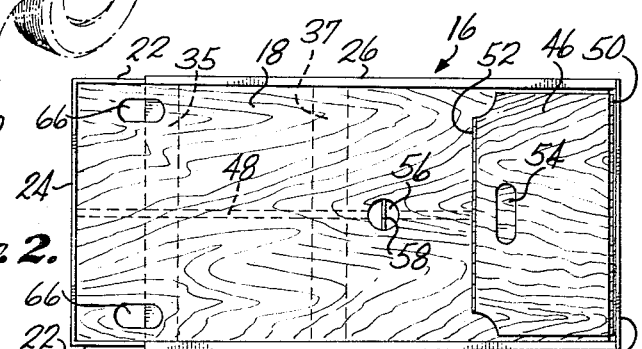
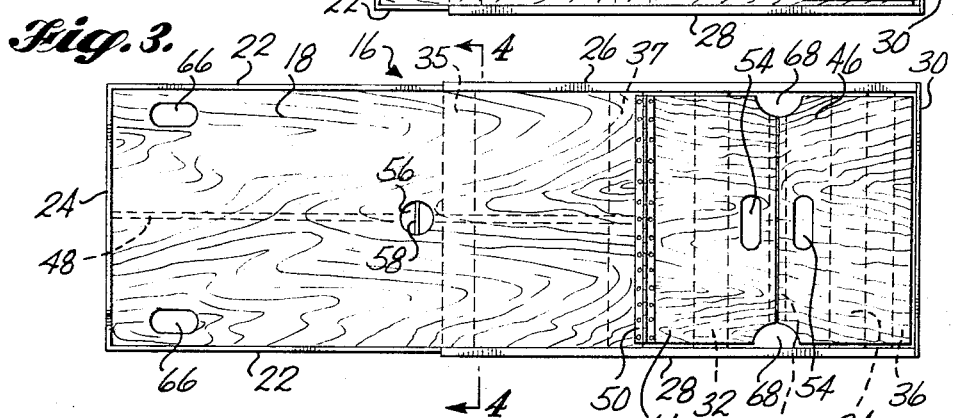
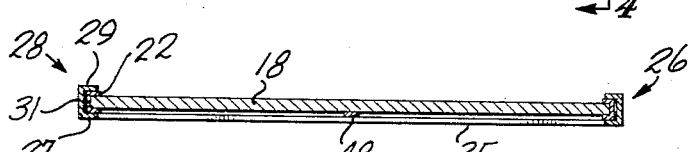
INVENTOR.
CHARLES B. MATSON
BY
*Clinton L. Mathis*
ATTORNEY Nov. 21, 1967  C. B. MATSON  3,353,194
FOLDING COT STRUCTURE
Filed July 28, 1966  2 Sheets-Sheet 2
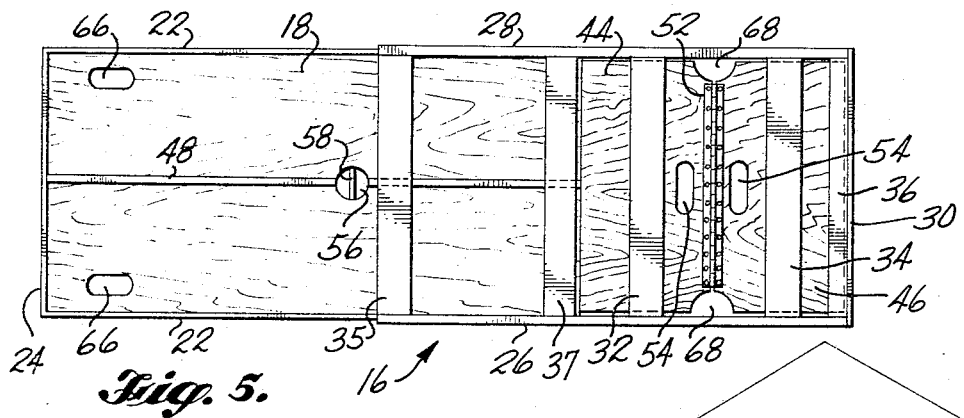
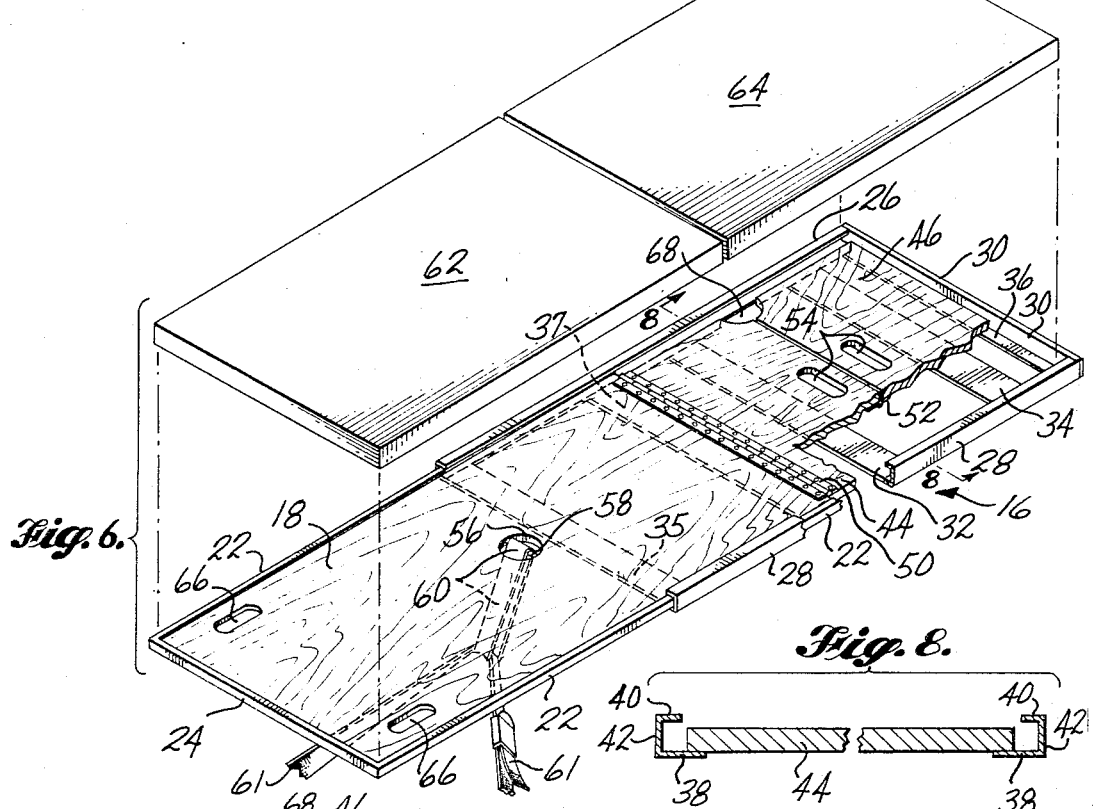
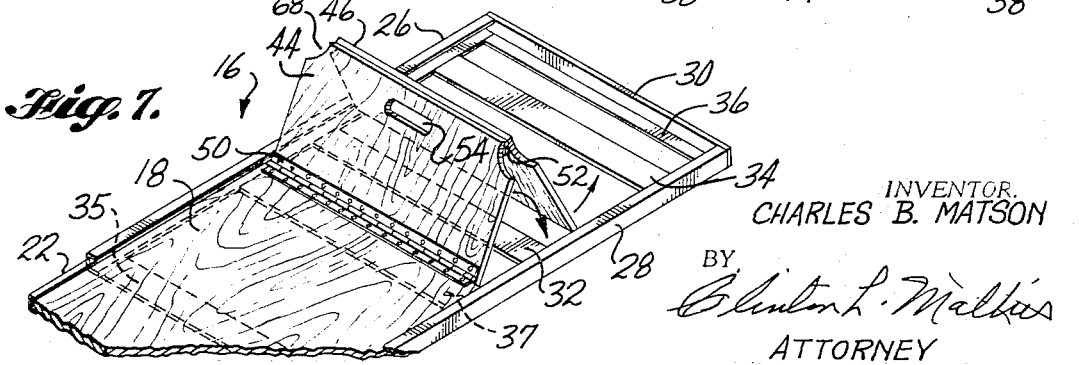
INVENTOR.
CHARLES B. MATSON
BY
ATTORNEY

United States Patent Office

3,353,194
Patented Nov. 21, 1967

3,353,194
FOLDING COT STRUCTURE
Charles B. Matson, 3265 S. 216th St.,
Seattle, Wash. 98188
Filed July 28, 1966, Ser. No. 568,608
9 Claims. (Cl. 5—118)

My invention relates to a folding cot structure and more particularly to an articulated structure adapted to be folded to a compact package for storage, and unfolded to form a cot resting upon the backs of the front and rear seats of an automobile.

More particularly, my invention relates to a cot which may be positioned, sidewise of an automobile, to leave the steering wheel, the adjacent front seat, and the rear seat on the same side of the car free and with the cot extending lengthwise of the car and on the opposite side thereof.

An object of my invention is to provide such a structure wherein I employ a first rectangular member of a length to span the distance between and rest upon the backs of the front and rear seats of an automobile which panel member will support the majority of the weight of an occupant or occupants utilizing the structure as a sleeping cot.

It is an object of my invention to provide a substantially U-shaped frame member having legs which are slidably mounted for traveling movement on the marginal edge portion of the above-mentioned rectangular member. Such substantially U-shaped frame member of my invention carries panel supporting means so that a second rectangular panel member may be supported thereby and cantilevered over the back of the front seat of an automobile to carry a lesser proportion of the weight of the user, such as the shoulders and head and neck portion of the user.

Another object of my invention is to hingedly connect the first and second rectangular members so that they may be folded upon each other for storage to provide a compact package for storage; and unfolded with a second rectangular panel member supported by the U-shaped frame member for use of the device as a cot resting upon the backs of the front and rear seats of an automobile.

Other more specific objects of my invention are to provide the said U-shaped frame member with legs which are U-shaped in section to slidingly receive within the legs of said U-shaped section the said first rectangular panel member.

Another object of the invention is to provide for relative non-frictional sliding engagement between the U-shaped frame member and the first rectangular panel member and with the U-shaped frame member providing a support for the second rectangular panel member and in a manner to eliminate interference between the two so far as relative sliding movement between the same is concerned.

Another object of my invention is to provide the said second rectangular panel member provided in a plurality of pieces so that the said second rectangular member may be swingingly mounted on said first rectangular panel member and with a minimum extension of the second rectangular member away from the hinge connection, thus permitting the second rectangular member to be folded into storage position or out of storage position while within an automobile having a relatively low roof level as compared to the height of the backs of the front and rear seats.

The foregoing, and other objects of this invention, are accomplished and will be readily apparent from the following specification and drawings, in which drawings:

FIG. 1 is a perspective view of an automobile of illustrative and conventional design shown in phantom and where my invention is shown in full lines;

FIG. 2 is a plan view of a device embodying my invention shown in folded position for storage, except with the second rectangular panel member at the head end portion only partially positioned for storage;

FIG. 3 is a plan view of the device and with the same unfolded in the position it will assume when formed into a cot;

FIG. 4 is a sectional view taken substantially on broken line 4—4 of FIG. 3;

FIG. 5 is a bottom plan view (FIG. 3 being a top plan view) to better illustrate my invention;

FIG. 6 is an exploded perspective view with a pad disposed over the cot frame to better illustrate my invention;

FIG. 7 is a fragmentary perspective view to better illustrate the structure of the second rectangular panel member at the head end portion of the cot; and FIG. 8 is a fragmentary sectional view of a modified form of my invention as the same would appear at the location of broken line 8—8 of FIG. 6.

Now referring to the drawings and wherein like reference numerals indicate like parts:

The automobile 10, shown in phantom, is illustrated as a convertible as such type of automobile will have a front seat 12 and a rear seat 14 but will not have a top to hide the illustration in the drawings of my invention as applied to an automobile. However, it is to be expressly understood that my invention is applicable to automobiles having roofs, such as sedans. In such FIG. 1, a device of my invention, illustrated generally by 16, is resting upon the backs of the front seat 12 and rear seat 14 of the automobile 10.

I provide a first rectangular panel member 18 which is of suitable length so that it will span and be supported both by the front seat 12 and the rear seat 14 and is of a width so as not to interfere with the steering wheel 20 of the automobile 10 and the front and rear seat areas on the same side of the automobile.

The panel 18 is formed of a material to provide desirable strength to support the weight of one or two users of the cot, tends to be form retaining, is light in weight, and is wear resistant. For such features, I find that 5-ply wood plywood ½" thick is economical and suitable. In order to decrease slide resistance of the side marginal edge portions of the panel 18, I provide U-shaped channel members 22 at the said marginal side edge portions and, in the interest of sturdiness of construction, the said U-shaped channels 22 at the marginal side edge portions are formed with an end 24 so that a U-shaped member will be continuous and can be applied merely by securing the channels 22 to the side marginal edges of the rectangular panel 18. In the event that it is desired to add longitudinal stability to the panel 18, the said U-shaped channels 22 and 24 may be metal but in the event that merely anti-friction edges are desired at the marginal side edge portions, the said strips may be plastic. While the panel 18 may have its edge portions cut down so that the channels 22 and 24 will form a continuous surface, I find that this is unnecessary and the said channels 22, 24 are shown as being applied over the panel 18, which panel 18 is of uniform thickness throughout.

A frame member which is U-shaped in plan comprises leg portions 26 and 28 and a base portion 30. As a means to slidingly mount and to retain the U-shaped frame member 26, 28, 30, to the first rectangular panel member 18, each of the leg portions 26 and 28 is U-shaped in section as best shown in FIG. 4. Thus, there should be a sliding fit tolerance between the inside walls of the said legs 26 and 28 and the molding or channel 22 on the marginal edge portions of the first rectangular panel member 18. Again, in the interest of simplicity and strength, the base portion 30 may be U-shaped in section so that the marginal edge portion of the U-shaped frame member 26, 28, 30, may be one continuous piece formed into the shape in plan illustrated.

In the form of the invention shown in FIGS. 1 to 7, inclusive, and particularly FIG. 4, the legs 26 and 28 are U-shaped in section with the legs 27 and 29 extending the same distance away from their base 31. So that said U-shaped frame member 26, 28, 30 may provide for supporting a second rectangular panel member, crosswise slats 32, 34, 35, 36, and 37 (see in bottom plan in FIG. 5) are secured, as by welding for strength, to the bottom leg 27 of the U-shaped in section legs 26 and 28 and base 30 (see FIG. 4), and thus said slats 32, 34, 35, 36, and 37 will not interfere with the sliding travel of the U-shaped frame member 26, 28, 30 relative to the rectangular panel member 18. Also, said cross slats 32, 34, 35, 36, and 37 provide for strengthening of the U-shaped frame member 26, 28, 30. In the modified form of my invention shown in FIG. 8 of the drawing, each of the legs 26 and 28 and the base 30 is shown with a section so that the lower leg 38 in section is longer or protrudes further away from the base 42 than does the leg 40 and thus the said legs 38 provide a shelf for a second rectangular panel member 44, 46. By having such a shelf, the number of cross slats 32, 34, 35, 36, and 37 may be reduced as the same will have a primary function of cross bracing the U-shaped frame member 26, 28, 30. The said cross slats 32, 34, 35, 36, and 37 and the said leg 38 will be below the path of travel of the first rectangular panel member 18 and thus will not interfere with traveling movement of the panel member 18 relative to the U-shaped frame member 26, 28, 30.

On the back side of first rectangular panel member 18 is provided a slide strip 48 which extends longitudinally of the first rectangular member 18 and thus cooperates with cross slats 32, 34, 35, 36, and 37 in preventing contact of said slats with the bottom side of the rectangular panel member 18.

The second rectangular panel member 44, 46 is hinged at an end portion thereof to an end portion of the first rectangular panel member 18 as by piano hinge 50. This piano hinge 50 is mounted on the upper surface and connects between the first rectangular panel member 18 and the part 44 of the second rectangular panel member 44, 46. By having the piano hinge so disposed, the second rectangular panel member 44, 46 (and both parts thereof) may be directly superposed on the first panel member 18 to provide an articulated structure adapted to be folded into a compact package for storage. Upon turning movement of the second rectangular panel member 44, 46 relative to the first rectangular panel member 18 substantially 180°, then the second panel member 44, 46 will be disposed in the same horizontal plane as the first panel member 18, be an extension thereof, and will be in a position to be supported by the U-shaped frame member 26, 28, 30, and particularly by the cross slats 32, 34, 35, 36, and 37, or, in part, by the leg 38 of FIG. 8, The proportions are such that the weight of the body of a user of the cot will have the major portion thereof supported by the panel member 18 which rests on the top of the backs of front seat 12 and rear seat 14 of the automobile 10 and only the shoulder portions and the head of the user of the cot will provide a weight which is cantilevered over the front seat 12 and supported by the U-shaped frame member 26, 28, 30. My invention provides for the support of the weight cantilevered over the front seat 12 and this even though my construction be of relatively light weight.

In order that the second rectangular panel member 44, 46 shall have a minimum rise relative to the piano hinge 50 and thus provide a clearance in connection with automobiles having a relatively low roof compared to the height of the front and rear seats 12 and 14, I hingedly connect the parts 44 and 46 of the second rectangular panel member 44, 46 by a second piano hinge 52 which is mounted on the under surface of said second rectangular panel member 44, 46 (see FIG. 5). Thus, as best illustrated in FIG. 7 of the drawing, the first rectangular panel member 18 is hingedly connected with the second rectangular panel member 44, 46 by piano hinge 50 to move in one direction as shown in FIG. 7 while the two sections of the second rectangular panel member 44, 46 are hinged to turn in the opposite direction. Thus, the clearance between a cot of my invention and the roof of an automobile need only be greater than half of the length of the second rectangular panel member 44, 46.

When the parts are in the position shown in FIG. 6 of the drawing, one of the hand holes 54 may be engaged and the parts moved to the position shown in FIG. 7 of the drawing. By continuing the movement thus started, the parts may be turned until they will assume the position shown in FIG. 2 of the drawings and then, if desired, for completing the unfolding, the part 46 of the second rectangular member 44, 46 may be turned substantially 180° until both of the parts of the second rectangular member 44, 46 may lie directly upon and parallel to the first rectangular panel member 18.

The width of the panel member 44, 46 will be less than the width of the first rectangular member 18 in view of the fact that the legs 26 and 28 encompass the marginal edges of the first panel member 18 for relative sliding movement while the second panel member 44, 46 moves in place by swinging movement about piano hinge 50.

The first rectangular panel member 18 is provided with a hole 56 and a cross pin 58 so that the said panel member 18 may be secured detachably to the automobile 10. A convenient way of doing this is to provide a strap 60 which is readily detachably connectable to the ordinary safety seat belt straps 61 now conventionally employed as safety belts for the passengers in the rear seat of an automobile. By employing such connection with the automobile, I prevent relative sliding motion forward of the device relative to the automobile and further, if the connection is made back of the longitudinal center of the device, this tends to hold the rear end portion of the rectangular member down so that any weight cantilevered over the front seat 12 is counteracted by said connection of the rectangular member 18 to the body of the automobile 10. While it is not expected, such a connection precludes against accidents in the event that someone should see fit to sit on the cot and forward of the front seat 12. This safety feature is particularly useful in connection with children who at times are rather unpredictable as to actions they may take.

In use, preferably a pad is employed for the comfort of users and which may comprise pad portions 62 and 64. The purpose of providing pad sections is so that when the structure is folded, the pad sections are no longer than a folded structure and thus there is provided a compact package for storage. While I have shown the pad sections 62 and 64 of the same length, obviously, one may be longer than the other and the longer shall be no greater than the length of the device shown in compact relation in FIG. 2 of the drawings. By having pads of desired length, it is possible to ensure that the hips of a user will at no time rest on a juncture between pads 62 and 64.

If desired, locking means may be employed to ensure that the device will be in locked position when the same is completely unfolded as shown in FIGS. 3 and 5, but I have not shown the same as they are not essential.

Also, in order to more thoroughly realize all of the advantages of my invention, I provide hand holes 66 in the first rectangular panel member 18 and I provide second hand holes 68 through the second rectangular panel member 44, 46—part of the handle 68 being formed in each of the parts 44 and 46. The hand holes 68 expose the legs 26 and 28 for hand grasping and the holes 66 expose the first rectangular panel member 18 for hand grasping and when necessary the structure of my invention may be used as a stretcher in moving a person lying on the structure from place to place as necessity may require.

From the foregoing, it will now be apparent that I have provided an articulated structure adapted to be folded to a compact package for storage and unfolded to form a cot resting upon the backs of the front and rear seats of an automobile wherein I provide a first rectangular panel member 18 having marginal side portions 22, the latter preferably being formed of metal for non-frictional surfaces and reinforcing or of plastic if only non-frictional surfaces are desired. Next, I have provided a substantially U-shaped frame member 26, 28, 30, the legs 26 and 28 of which are slidably mounted for traveling movement on the marginal side portions 22 of the panel member 18. Next, I have provided panel supporting means, such as crosswise slats 32, 34, 35, 36, and 37, or leg portion 38 of FIG. 8, which constitute panel supporting means carried by the U-shaped frame member 26, 28, 30. Next, I have provided a second rectangular panel member 44, 46 which preferably comprises two parts hinged together by piano hinge 52 and which second rectangular member 44, 46 is hinged to the first rectangular panel member 18 by hinge means 50. Thus, when the second rectangular panel member 44, 46 swings about its hinge 50, the second panel member 44, 46 is mounted for turning movement from a position directly superposed on the first panel member as shown in FIG. 2 (in said FIG. 2 only the portion 44 lying directly on the first panel member 18) and with the second panel member 44, 46 movable to a position substantially 180° from its first position wherein the second panel member 44, 46 is an extension of the first panel member, is supported by the panel supporting means, such as cross slats 32, 34, 35, 36, and 37, as shown, for example, in FIG. 3, or supported by the leg 38 of FIG. 8. Also, I have shown a structure wherein the marginal edge portions of the rectangular panel member 18 may comprise metallic edges 22 which are slidable in the metallic legs 26 and 28 of the U-shaped frame member 26, 28, 30. Next, I have shown the supporting means for the second rectangular panel member 44, 46, which supporting means may comprise the cross slats 32, 34, 35, 36, and 37, or the legs 38 of FIG. 8, all of which are positioned below (when the structure is unfolded and cot functioning) the portions of the U-shaped frame member 26, 28, 30 which contact the marginal edge portions of the first rectangular panel member 18. Next, I have provided a structure wherein by the employment of the piano hinge 52, the second rectangular panel member 44, 46 comprises a plurality of panels hinged together at their end portions for folding said second panel member to a lesser length away from the primary hinge or piano hinge 50. Also, in providing the two piano hinges 50 and 52, one disposed on the top of the structure and the other on the bottom thereof, the second rectangular panel member 44, 46 turns in one direction and the said two parts of the second rectangular panel member 44, 46 turn in the other direction about piano hinge 52. Next, I have provided the opening or hole 56 with the cross pin 58 therein permitting the structure to be detachably connected to an automobile, such as through strap 60 and safety straps 61. Next, I have provided the hand holes 66 and 68 at opposite ends of the device so that when expedient, the device may be used as a stretcher and carried by parties grasping the said hand holes.

Obviously, changes may be made in the form, dimensions, and the parts of my invention without departing from the principle thereof, the above setting forth only preferred forms of embodiment of my invention.

I claim:

1. An articulated structure adapted to be folded to a compact package for storage and unfolded to form a cot resting upon the backs of the front and rear seats of an automobile comprising: a first rectangular panel member having spaced apart parallel marginal side portions and end portions; a substantially U-shaped frame member, the legs of which are slidingly mounted for traveling movement on the marginal side portions of said first panel member; panel supporting means carried by said U-shaped frame member and disposed in non-interfering relation to the said traveling movement of said U-shaped frame member; a second rectangular panel member; and primary hinge means connecting an end portion of said second panel member with an end portion of said first panel member for movement of the second panel member from a position directly superposed on the first panel member to a position substantially 180° therefrom wherein the second panel member lays in the same plane as the first panel member, is an extension thereof, and is supported by the said panel-supporting means carried by said U-shaped frame member.

2. The structure of claim 1 wherein the said parallel marginal side portions of the first rectangular panel member are metallic and the legs of said U-shaped frame member are metallic and U-shaped in section.

3. The combination of claim 1 wherein the legs of said U-shaped frame member are each U-shaped in section and the lower leg of said section protrudes further away from the base thereof than does the other leg thereof and said further protruding leg functions as the panel supporting means carried by said U-shaped frame member.

4. The combination of claim 1 wherein the legs of said U-shaped frame member are each U-shaped in section and the lower leg of said section carries the panel supporting means carried by said U-shaped frame member.

5. The structure of claim 1 wherein said panel supporting means carried by said U-shaped frame member are mounted below (when the structure is unfolded and cot functioning) the portions of the U-shaped frame member which contact the marginal side portions of the first panel member during traveling movement.

6. The combination of claim 1 wherein said second rectangular panel member comprises a plurality of panels hinged together at their end portions for folding said second panel to a lesser length away from said primary hinge means.

7. The combination of claim 4 wherein said second rectangular panel member comprises two panels and hinge means securing said two panels together for turning movement between said two panels in a direction, when unfolding the structure, which is opposite to the direction of turning of the second panel member to the first panel member when unfolding the structure.

8. The combination of claim 1 wherein an opening with a cross pin is provided in the first rectangular member for securance thereof to the body of an automobile.

9. The combination of claim 1 wherein hand holes are provided in the first rectangular member adjacent the marginal side portions thereof and at the end portion away from said primary hinge means to permit hand grasping of said first rectangular member and holes are provided in the second rectangular member in the area thereof adjacent the legs of the substantially U-shaped frame member to permit hand grasping of said legs.

References Cited

UNITED STATES PATENTS

| 2,409,934 | 10/1946 | Haggard et al. | 5—82 |
| 2,677,159 | 5/1954 | Berg | 287—20.924 |
| 3,245,092 | 4/1966 | Kreuz | 5—68 |

BOBBY R. GAY, *Primary Examiner.*

R. D. KRAUS, *Assistant Examiner.*